United States Patent
Jacks et al.

[15] 3,661,710

[45] May 9, 1972

[54] SYNTHESIS OF CONJUGATED OCTADECATRIENOIC ACID USING ENZYMES FROM TUNG

[72] Inventors: Thomas J. Jacks, Metairie; Lawrence Y. Yatsu, New Orleans, both of La.

[73] Assignee: The United States of America as represented by the Secretary of Agriculture

[22] Filed: May 22, 1970

[21] Appl. No.: 39,921

[52] U.S. Cl. ................................................. 195/30, 195/66
[51] Int. Cl. .......................................................... C12b 1/00
[58] Field of Search ........................................ 195/30, 66, 51

[56] References Cited

OTHER PUBLICATIONS

Markley, K. S., " Fatty Acids," Part 3, p 1509– 23 Publishers–Interscience, 1964.

*Primary Examiner*—A. Louis Monacell
*Assistant Examiner*—Gary M. Nath
*Attorney*—R. Hoffman and W. Bier

[57] ABSTRACT

Conjugated trienoic fatty acid was formed in a mixture containing CoASH, NADH, either ADP or ATP, $MgSO_4$, castor fatty acid, and enzyme prepared from tung nuts. The enzyme was prepared as a protein, which is soluble in 0.1 M tris- HCl buffer (pH 7.2), from acetone-insoluble powder of maturing tung nuts.

7 Claims, No Drawings

SYNTHESIS OF CONJUGATED OCTADECATRIENOIC ACID USING ENZYMES FROM TUNG

A non-exclusive, irrevocable, royalty-free license in the invention herein described, throughout the world for all purposes of the United States Government, with the power to grant sublicenses for such purposes, is hereby granted to The Government of the United States of America.

This invention relates to the synthesis of conjugated trienoic fatty acids. More specifically, this invention relates to the synthesis of conjugated trienoic fatty acid in vitro as catalyzed by enzymes prepared from developing tung nuts and in the presence of certain enzymic cofactors.

The main object of this invention is the synthesis of conjugated trienoic fatty acids. More specifically, the object is the synthesis of conjugated octadecatrienoic acid. Lesser objects are the use of enzymes as the catalytic agents for this synthesis and the preparation of such enzymes from a plant source which, in this case, is tung (Aleurites fordii, Hemsl).

Conjugated trienoic fatty acids are in great demand as drying oils in paint and other coatings. These acids are extracted from plant materials, such as tung nuts, but have never been synthesized in vitro. The object of this invention is the synthesis of conjugated trienoic fatty acid in vitro. Synthesis of conjugated trienoic fatty acids in vitro provides a steady supply of such acids.

We have now found that acetone-insoluble powders prepared from developing tung nuts catalyze the formation of conjugated octadecatrienoic acid from fatty acids of castor oil. The preferred synthesis required reduced coenzyme A (CoASH), reduced nicotinamide-adenine dinucleotide (NADH), enzyme from tung nuts, and either adenosine-5'-diphosphate (ADP) or adenosine-5'-triphosphate (ATP) for best results.

Developing tung nuts were collected before, during, and after the period of active oil accumulation in the endosperm (L. Y. Yatsu and M. R. Easterling, Plant Physiol. 39:1017, 1964). Thinly sliced tissue was macerated in liquid nitrogen with a mortar and pestle. The small, frozen pieces were added to an equal weight of sand and homogenized at $-78°$ C with sufficient acetone to ensure fluidity of the homogenate. The insoluble residue was washed by vacuum filtration with acetone at $-78°$ C until the filtrate appeared colorless and then with sufficient ether to displace residual acetone. Ether was removed by immediately fluffing the powder at room temperature in an exhaust hood. The powder was further dried over $P_2O_5$ in a vacuum of 0.05 torr and then stored in sealed ampules at $-20°$ C.

Enzyme was prepared by triturating the powder in 0.1 M tris-HCl buffer (pH 7.2), filtering the suspension through glass wool, and centrifuging the filtrate at 1,100 g for 10 min. Dithiothreitol was added to the supernatant to a concentration of $4 \times 10^{-3}$M. This enzyme preparation, containing 15 to 35 mg of protein per ml (mostly storage protein of the seed), was homogenized with other components of the reaction mixture and the mixture allowed to incubate at $30°$ C with continual homogenization. At various time intervals portions of 0.6 ml were removed and added to 0.4 ml of 0.5 N HCl. Fatty acids were extracted from each acidified reaction mixture into 3.0 ml of hexane (spectro-photometric grade) and the content of conjugated trienoic fatty acid was determined spectrophotometrically (A.O.C.S. Official Method Cd 7-58, Revised 1959; J. S. Hoffman, R. T. O'Connor, D. C. Heinzelman, and W. G. Bickford, J. Am. Oil Chem. Soc. 34:338, 1957).

Best results were obtained when the reaction mixture contained, in 0.6 ml or 0.8 ml, 5 $\mu$moles of CoASH, 11 $\mu$moles of NADH, 10 $\mu$moles of ATP or ADP, 1.2 $\mu$moles of $MgSO_4$, 230 $\mu$moles of fatty acid from castor oil, and sufficient 0.5 N KOH to neutralize the above mixture. The addition of 1.4 or 1.2 ml of enzyme preparation to this mixture obtained synthesis of conjugated octadecatrienoic fatty acid. Only enzyme preparations from acetone-insoluble powders of maturing tung nuts that were rapidly accumulating oil were enzymically active. Neither immature nuts that contained small amounts of endosperm nor fully mature, quiescent nuts provided active powders

EXAMPLE 1

Developing tung nuts were collected before, during, and after the period of active oil accumulation in the endosperm (L. Y. Yatsu and M. R. Easterling, Plant Physiol. 39: 1017 1964). Thinly sliced tissue was macerated in liquid nitrogen with a mortar and pestle. The small, frozen pieces were added to an equal weight of sand and homogenized at $-78°$ C with sufficient acetone to ensure fluidity of the homogenate. The insoluble residue was washed by vacuum filtration with acetone at $-78°$ C until the filtrate appeared colorless and then with sufficient ether to displace residual acetone. Ether was removed by immediately fluffing the powder at room temperature in an exhaust hood. The powder was further dried over $P_2O_5$ in a vacuum of 0.05 torr and then stored in sealed ampules at $-20°$ C.

The enzyme was prepared by triturating the powder in 0.1 M tris-HCl buffer (pH 7.2), filtering the suspension through glass wool, and centrifuging the filtrate at 1,100 g for 10 min. Dithiothreitol was added to the supernatant to a concentration of $4 \times 10^{-3}$M. This enzyme preparation contains 15 to 35 mg of protein per ml.

The enzyme preparation containing 49 mg of protein, 120 $\mu$moles of tris-HCl buffer (pH 7.2) and 4.8 $\mu$moles of dithiothreitol was homogenized with 5$\mu$moles of CoASH, 11 $\mu$moles of NADH, 10 $\mu$moles of ATP, 1.2 $\mu$moles of $MgSO_4$, 230 $\mu$moles of castor oil fatty acid, sufficient 0.5 N KOH to neutralize the mixture. The mixture was allowed to incubate for 45 minutes at $30°$ C with continual homogenization At various time intervals portions of 0.6 ml were removed and added to 0.4 ml of 0.5 N HCl. Fatty acids were extracted from each acidified reaction mixture into 3.0 ml of hexane (spectrophotometric grade) and the content of conjugated trienoic fatty acid was determined spectrophotometrically (A.O.C.S. Official Method Cd 7–58, Revised 1959; J. S. Hoffman, R. T. O'Connor, D. C. Heinzelman, and W. G. Bickford, J. Am. Oil Chem. Soc. 34: 338, 1957).

EXAMPLE 2

The reaction given in Example 1 was repeated except that CoASH was omitted. After 45 min. 12.4 m$\mu$ moles of conjugated trienoic fatty acid was produced.

EXAMPLE 3

The reaction given in Example 1 was repeated except that NADH was omitted. After 45 min. 12.3 m$\mu$ moles of conjugated trienoic fatty acid was produced.

EXAMPLE 4

The reaction given in Example 1 was repeated except that NADH was omitted and 11 $\mu$moles of oxidized nicotinamide-adenine dinucleotide, NAD, was present. After 45 min. 29.9 m$\mu$ moles of conjugated trienoic fatty acid was produced.

EXAMPLE 5

The reaction given in Example 1 was repeated except that NADH was absent and 11 $\mu$moles of oxidized nicotinamide-adenine dinucleotide phosphate, NADP, was present. After 45 min. 9.2 m$\mu$ moles of conjugated trienoic fatty acid was produced.

EXAMPLE 6

The reaction given in Example 1 was repeated except that ATP was omitted. After 45 min. 1.5 m$\mu$ moles of conjugated trienoic fatty acid was produced.

EXAMPLE 7

The reaction given in Example 1 was repeated except that ATP was omitted and 10 μmoles of ADP were present. After 45 min. 31.0 μmoles of conjugated trienoic fatty acid was produced.

We claim:

1. A process for preparing an enzyme, useful in the synthesis of conjugated trienoic fatty acid, which process comprises:
   a. macerating in liquid nitrogen thinly sliced tissue from tung nuts which are actively accumulating oil,
   b. homogenizing the macerated tissue from (a) with acetone and sand at a temperature of about −78° C,
   c. washing the acetone-insoluble residue with acetone at a temperature of about −78° C and then with ether,
   d. removing the ether from (c) and drying the powder in vacuo,
   e. triturating the powder from (d) in 0.1 M tris-HCl buffer,
   f. filtering the suspension from (e) through glass wool,
   g. centrifuging the filtrate from (f) at about 1,100 g for about 10 minutes,
   h. adjusting the amount of enzyme in the supernatant from (g) to a concentration of about 15 to 35 mg of protein per ml by the addition of 0.1 M tris-HCl buffer.

2. A process for synthesizing conjugated trienoic acid in vitro which process comprises:
   a. macerating in liquid nitrogen thinly sliced tissue from tung nuts which are actively accumulating oil,
   b. homogenizing the macerated tissue from (a) with acetone and sand at a temperature of about −78° C,
   c. washing the acetone-insoluble residue with acetone at a temperature of about −78° C and then with ether,
   d. removing the ether from (c) and drying the powder in vacuo,
   e. triturating the powder from (d) in 0.1 M tris-HCl buffer,
   f. filtering the suspension from (e) through glass wool,
   g. centrifuging the filtrate from (f) at about 1,100 g for about 10 minutes,
   h. adjusting the amount of enzyme in the supernatant from (g) to a concentration of about 15 to 35 mg of protein per ml by the addition of 0.1 M tris-HCl buffer,
   i. homogenizing about 1 part of the enzyme from (h) with about 0.43 to 0.66 parts of a mixture consisting of about 7.1 mM reduced coenzyme A, about 15.7 mM of reduced nicotinamide-adenine dinucleotide about 11.4 mM of a nucleotide pyrophosphate selected from the group consisting of adenosine-5'-diphosphate and adenosine-5'-triphosphate, about 1.7 mM $MgSO_4$, about 330 mM castor fatty acid and a sufficient amount of 0.5 N KOH to neutralize the mixture,
   j. incubating the reaction mixture from (i) at 30° C for a period of about 45 minutes,
   k. isolating the conjugated trienoic fatty acid from the aqueous reaction mixture from (j) by adding about 1.33 parts of 0.5 N HCl and then about 10 parts of hexane.

3. A process for synthesizing conjugated trienoic acid in vitro which process comprises:
   a. macerating in liquid nitrogen thinly sliced tissue from tung nuts which are actively accumulating oil,
   b. homogenizing the macerated tissue from (a) with acetone and sand at a temperature of about −78° C,
   c. washing the acetone-insoluble residue with acetone at a temperature of about −78° C and then with ether,
   d. removing the ether from (c) and drying the powder in vacuo,
   e. triturating the powder from (d) in 0.1 M tris-HCl buffer,
   f. filtering the suspension from (e) through glass wool,
   g. centrifuging the filtrate from (f) at about 1,100 g for about 10 minutes,
   h. adjusting the amount of enzyme in the supernatant from (g) to a concentration of about 15 to 35 mg of protein per ml by the addition of 0.1 M tris-HCl buffer,
   i. homogenizing about 1 part of the enzyme from (h) with about 0.43 to 0.66 parts of a mixture consisting of about 15.7 mM of reduced nicotinamide-adenine dinucleotide, about 11.4 mM of a nucleotide pyrophosphate selected from the group consisting of adenosine-5'-diphosphate and adenosine-5'-triphosphate, about 1.7 mM $MgSO_4$, about 330 mM castor fatty acid and a sufficient amount of 0.5 N KOH to neutralize the mixture,
   j. incubating the reaction mixture from (i) at 30° C for a period of about 45 minutes,
   k. isolating the conjugated trienoic fatty acid from the aqueous reaction mixture from (j) by adding about 1.33 parts of 0.5 N HCl and then about 10 parts of hexane.

4. A process for synthesizing conjugated trienoic acid in vitro which process comprises:
   a. macerating in liquid nitrogen thinly sliced tissue from tung nuts which are actively accumulating oil,
   b. homogenizing the macerated tissue from (a) with acetone and sand at a temperature of about −78° C,
   c. washing the acetone-insoluble residue with acetone at a temperature of about −78° C and then with ether,
   d. removing the ether from (c) and drying the powder in vacuo,
   e. triturating the powder from (d) in 0.1 M tris-HCl buffer,
   f. filtering the suspension from (e) through glass wool,
   g. centrifuging the filtrate from (f) at about 1,100 g for about 10 minutes,
   h. adjusting the amount of enzyme in the supernatant from (g) to a concentration of about 15 to 35 mg of protein per ml by the addition of 0.1 M tris-HCl buffer,
   i. homogenizing about 1 part of the enzyme from (h) with about 0.43 to 0.66 parts of a mixture consisting of about 7.1 mM reduced coenzyme A, about 11.4 mM of a nucleotide pyrophosphate selected from the group consisting of adenosine-5'-diphosphate and adenosine-5'-triphosphate, about 1.7 mM $MgSO_4$, about 330 mM castor fatty acid and a sufficient amount of 0.5 N KOH to neutralize the mixture,
   j. incubating the reaction mixture from (i) at 30° C for a period of about 45 minutes,
   k. isolating the conjugated trienoic fatty acid from the aqueous reaction mixture from (j) by adding about 1.33 parts of 0.5 N HCl and then about 10 parts of hexane.

5. A process for synthesizing conjugated trienoic acid in vitro which process comprises:
   a. macerating in liquid nitrogen thinly sliced tissue from tung nuts which are actively accumulating oil,
   b. homogenizing the macerated tissue from (a) with acetone and sand at a temperature of about −78° C,
   c. washing the acetone-insoluble residue with acetone at a temperature of about −78° C and then with ether,
   d. removing the ether from (c) and drying the powder in vacuo,
   e. triturating the powder from (d) in 0.1 M tris-HCl buffer,
   f. filtering the suspension from (e) through glass wool,
   g. centrifuging the filtrate from (f) at about 1,100 g for about 10 minutes,
   h. adjusting the amount of enzyme in the supernatant from (g) to a concentration of about 15 to 35 mg of protein per ml by the addition of 0.1 M tris-HCl buffer,
   i. homogenizing about 1 part of the enzyme from (h) with about 0.43 to 0.66 parts of a mixture consisting of about 7.1 mM reduced coenzyme A, about 11 μmoles of oxidized nicotinamide-adenine dinucleotide, about 11.4 mM of a nucleotide pyrophosphate selected from the group consisting of adenosine-5'-diphosphate and adenosine-5'-triphosphate, about 1.7 mM $MgSO_4$, about 330 mM castor fatty acid and a sufficient amount of 0.5 N KOH to neutralize the mixture,
   j. incubating the reaction mixture from (i) at 30° C for a period of about 45 minutes,
   (k) isolating the conjugated trienoic fatty acid from the aqueous reaction mixture from (j) by adding about 1.33 parts of 0.5 N HCl and then about 10 parts of hexane.

6. A process for synthesizing conjugated trienoic acid in vitro which process comprises:
   a. macerating in liquid nitrogen thinly sliced tissue from tung nuts which are actively accumulating oil,
   b. homogenizing the macerated tissue from (a) with acetone and sand at a temperature of about −78° C,
   c. washing the acetone-insoluble residue with acetone at a temperature of about −78° C and then with ether,
   d. removing the ether from (c) and drying the powder in vacuo,
   e. triturating the powder from (d) in 0.1 M tris-HCl buffer,
   f. filtering the suspension from (e) through glass wool,
   g. centrifuging the filtrate from (f) at about 1,100 g for about 10 minutes,
   h. adjusting the amount of enzyme in the supernatant from (g) to a concentration of about 15 to 35 mg of protein per ml by the addition of 0.1 M tris-HCl buffer,
   i. homogenizing about 1 part of the enzyme from (h) with about 0.43 to 0.66 parts of a mixture consisting of about 7.1 mM reduced coenzyme A, about 11 μmoles of oxidized nicotinamide-adenine dinucleotide phosphate, about 11.4 mM of a nucleotide pyrophosphate selected from the group consisting of adenosine-5′-diphosphate and adenosine-5′-triphosphate, about 1.7 mM $MgSO_4$, about 330 mM castor fatty acid, and a sufficient amount of 0.5 N KOH to neutralize the mixture,
   j. incubating the reaction mixture from (i) at 30° C for a period of about 45 minutes,
   k. isolating the conjugated trienoic fatty acid from the aqueous reaction mixture from (j) by adding about 1.33 parts of 0.5 N HCl and then about 10 parts of hexane.

7. A process for synthesizing conjugated trienoic acid in vitro which process comprises:
   a. macerating in liquid nitrogen thinly sliced tissue from tung nuts which are actively accumulating oil,
   b. homogenizing the macerated tissue from (a) with acetone and sand at a temperature of about −78° C,
   c. washing the acetone-insoluble residue with acetone at a temperature of about −78° C and then with ether,
   d. removing the ether from (c) and drying the powder in vacuo,
   e. triturating the powder from (d) in 0.1 M tris-HCl buffer,
   f. filtering the suspension from (e) through glass wool,
   g. centrifuging the filtrate from (f) at about 1,100 g for about 10 minutes,
   h. adjusting the amount of enzyme in the supernatant from (g) to a concentration of about 15 to 35 mg of protein per ml by the addition of 0.1 M tris-HCl buffer,
   i. homogenizing about 1 part of the enzyme from (h) with about 0.43 to 0.66 parts of a mixture consisting of about 7.1 mM reduced coenzyme A, about 15.7 mM of reduced nicotinamide-adenine dinucleotide, about 1.7 mM $MgSO_4$, about 330 mM castor fatty acid and a sufficient amount of 0.5 N KOH to neutralize the mixture,
   j. incubating the reaction mixture from (i) at 30° C for a period of about 45 minutes,
   k. isolating the conjugated trienoic fatty acid from the aqueous reaction mixture from (j) by adding about 1.33 parts of 0.5 N HCl and then about 10 parts of hexane.

* * * * *